United States Patent

[11] 3,550,749

| [72] | Inventor | William E. Story<br>Knoxville, Tenn. |
|---|---|---|
| [21] | Appl. No. | 748,791 |
| [22] | Filed | July 30, 1968 |
| [45] | Patented | Dec. 29, 1970 |
| [73] | Assignee | East Tennessee Packing Company<br>Knoxville, Tenn.<br>a corporation of Tennessee |

[54] METHOD AND APPARATUS FOR TRANSFERRING ARTICLES
14 Claims, 6 Drawing Figs.

| [52] | U.S. Cl. | 198/31, 198/139 |
|---|---|---|
| [51] | Int. Cl. | B65g 15/28, B65g 47/26 |
| [50] | Field of Search | 198/31(A2), 139, 208 |

[56] References Cited

UNITED STATES PATENTS

| 2,326,098 | 8/1943 | Kimmich | 198/208X |
| 3,106,280 | 10/1963 | Baker | 198/31X(A2) |

FOREIGN PATENTS

| 392,947 | 3/1923 | Germany | 198/31(A2) |

*Primary Examiner*—Edward A. Sroka
*Attorney*—Burns, Doane, Benedict, Swecker and Mathis

ABSTRACT: Transfer equipment for conveying a series of articles in a row and depositing them in multiple rows onto a receiving conveyor. The transfer equipment includes an endless transfer conveyor having a rectilinear movable end portion which reciprocates across the surface of the receiving conveyor at a predetermined rate to deposit a row of articles on the receiving conveyor. The rate at which the end portion is moved back and forth may be adjusted by controls to effect the desired arrangement of rows on the receiving conveyor.

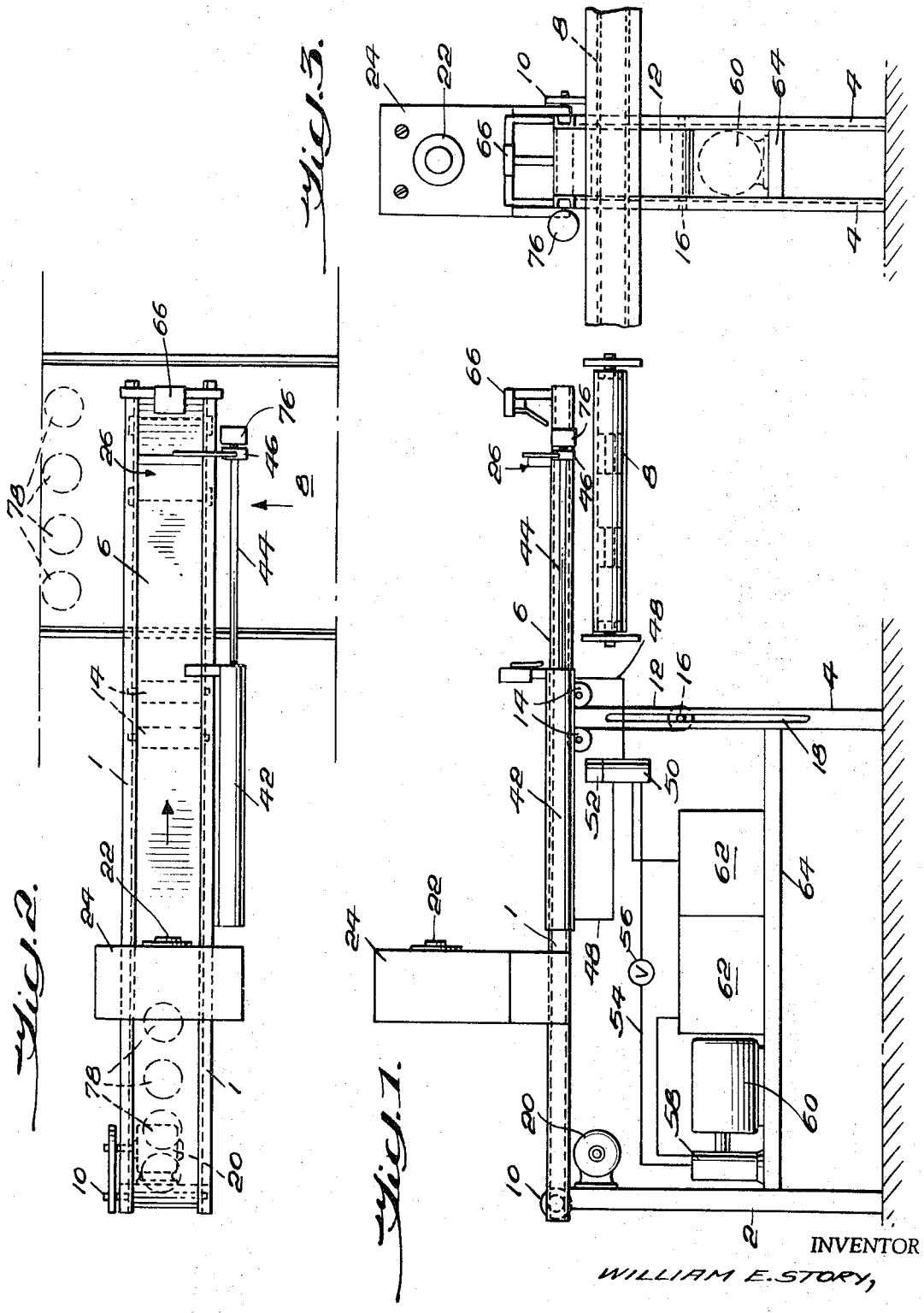

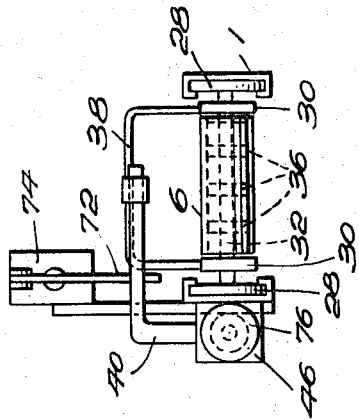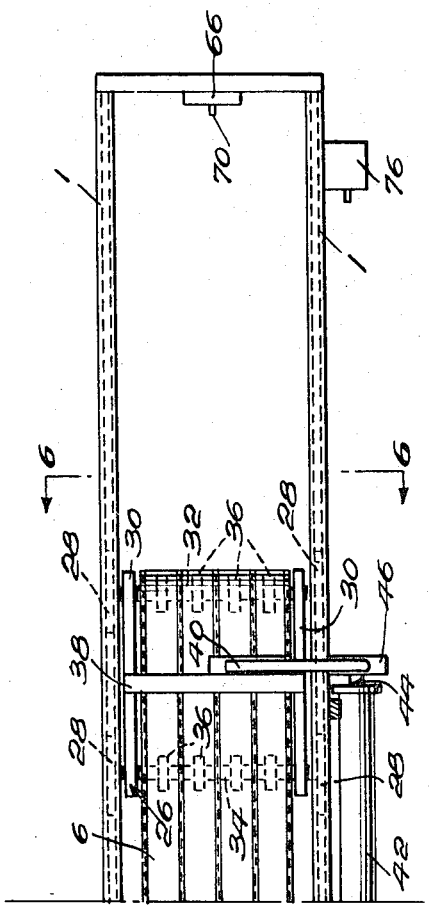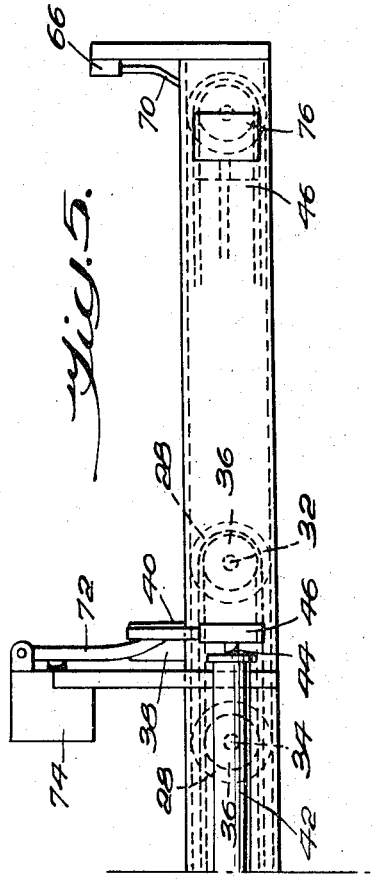

3,550,749

METHOD AND APPARATUS FOR TRANSFERRING ARTICLES

BACKGROUND OF THE DISCLOSURE

This invention relates to improvements in transfer equipment of the character designed for conveying a series of articles and transferring these from one conveyor onto a receiving conveyor in parallel rows extending transversely of the direction of travel of the receiving conveyor.

Transfer equipment of this general nature which has been proposed heretofore has been very complex and expensive to build and to maintain in service. Conventional equipment typically provides a fixed spacing between articles in a row and does not allow adjustment readily for variation in spacing between one job and the next. Furthermore, conventional equipment does not provide means for readily compensating for changes in speed of either the transfer conveyor or the receiving conveyor.

One object of the invention is to simplify and improve transfer equipment which will convey articles and deliver the same onto a receiving conveyor in multiple parallel rows extending transversely of the direction of travel of the conveyor.

Another object of the invention is to provide simple and inexpensive means for effecting rectilinear movement of the discharge end of the transfer conveyor relative to the receiving conveyor so as to provide for the transferring action at relatively high speed and in smooth operation.

Still another object of the invention is to provide for variable control of the transfer conveyor discharge mechanism.

SUMMARY OF THE INVENTION

These objects may be accomplished according to one embodiment of the invention by providing an endless transfer conveyor on a horizontal frame with the discharge end of the conveyor frame extending transversely across the surface of a receiving conveyor. The receiving conveyor travels in a direction at right angles to the direction of travel of the transfer conveyor.

The discharge end of the transfer conveyor frame is provided with a carriage having power means connected therewith for reciprocating said carriage in properly timed relation with the rate of travel of the transfer conveyor. The endless conveyor passes around a roller on the carriage, so that the discharge end of the conveyor is determined by the position of the carriage roller. The conveyor frame also has a vertical guide for a takeup roller around which the transfer conveyor passes. As the carriage moves along the frame, the takeup roller in the guide and maintains tension in the transfer conveyor.

The carriage is normally positioned at the outer end of its travel, so that the transfer conveyor extends over a substantial portion of the width of the receiving conveyor. Articles on the transfer conveyor actuate a switch when the first article reaches the discharge end of the conveyor, and the switch actuates power means for displacing the carriage across the receiving conveyor, thereby depositing the first article and those articles following the first articles on the receiving conveyor in a transverse row. A second switch reverses the movement of the carriage and it returns to its normal position at a greater rate than the rate of advance of the transfer conveyor.

A hydraulic cylinder may be used for back and forth movement of the carriage under control of suitable hydraulic valves which regulate the travel of the carriage. The conveyor is preferably operated by DC current connected with an AC converter, and suitable controls are provided to effect uniform speed of operation of the transfer conveyor as desired.

DESCRIPTION OF THE DRAWINGS

This embodiment of the invention is illustrated in the accompanying drawings, in which:

FIG. 1 is a side elevational view of the transfer equipment;
FIG. 2 is a top plan view thereof;
FIG. 3 is an end elevational view thereof;
FIG. 4 is a partial top plan view of the discharge end of the transfer conveyor, showing the carriage in retracted position;
FIG. 5 is a side elevational view of the transfer conveyor as in FIG. 4; and
FIG. 6 is a detail cross-sectional view along the line 6-6 in FIG. 4.

DESCRIPTION OF THE PREFERRED EMBODIMENT

The machine is shown as provided with a suitable top frame having a pair of elongated side members, generally indicated at 1. These members 1 are preferably channel-shaped to form tracks or guides for the conveying mechanism. The top frame 1 is supported in a suitable elevated position, as for example on legs 2 and 4.

A transfer conveyor is indicated at 6 comprising an endless belt-type conveyor which has a projecting end portion extending in overlapping relation with a receiving conveyor, generally indicated at 8, as shown in FIGS. 1 and 2. The conveyors 6 and 8 may be disposed at right angles to each other, as illustrated, or be turned to angular positions with respect to each other as desired. The conveyor 8 is driven continuously by suitable drive means.

The conveyors 6 and 8 are formed of a flexible material according to the nature of the articles that are to be transferred. One use of this machine is for transferring meat patties and an endless band of wire links or chain links are used for the respective conveyors to avoid adhesion of the meat to the conveyor surfaces. However, other types of conveyor surfaces may be used as desired, according to the materials to be transferred, such as rubber belts, slats, etc.

The conveyor 6 is an endless belt-type conveyor which extends horizontally along the top of the frame 1 from a head roller 10 to the discharge point at the opposite end of the frame 1. Suitable guide rollers may be provided in the frame 1 for the upper and lower runs of the conveyor 6. The lower run of the conveyor 6 has a loop portion 12 (FIG. 3) that is suspended between a pair of guide rollers 14 on the frame 1. A roller 16 is supported by the chain in the bight of the loop portion. The roller 16 is provided with trunnions that are received within slots 18 in the supporting posts 4. The slots 18 allow the roller 16 to move freely up and down between the posts 4 so that the weight of the roller 16 maintains tension in the conveyor 6.

The conveyor 6 is driven by a suitable source of power, such as DC current electric motor 20 that is connected with the head roller 10. The speed of the motor 20 and the corresponding speed of travel of the conveyor 6 may be varied continuously over a wide range of speeds by means of a control dial, generally indicated at 22 on a control panel 24. The control panel 24 preferably includes electrical apparatus for converting current from an AC power source to DC current. The control panel 24 may include, for example, a variable autotransformer connected across the terminals of the AC power source, with the variable center tap being connected with a full wave rectifier bridge from which DC power at a controlled voltage is supplied to the armature of the motor 20. The field of the motor 20 is supplied with a constant DC voltage through a separate full wave rectifier bridge connected across the windings of the autotransformer. Thus, the speed of the motor 20 can be changed, but the torque of the motor 20 remains substantially constant.

The discharge end of the conveyor 6 is supported on a carriage 26. The carriage 26 is provided with rollers 28 mounted in guides formed in the rails 1, as shown particularly in FIG. 6, so as to move rectilinearly along the rails between the positions shown in FIGS. 1 and 4.

The carriage 26 includes side members 30, a forward roller shaft 32 and a rear roller shaft 34. The rollers 28 are mounted on the opposite ends of the shafts 32 and 34, and extend transversely of the carriage 26. The shaft 32 at the forward end of the carriage 26 has a plurality of guide wheels 36 mounted thereon, forming a head roller for the discharge end of the endless conveyor 6 and about which this endless conveyor extends. The guide wheels 36 rotate freely relative to the rollers 28.

Extending in bridging relation across the side members 30 of the carriage 26 is a saddle 38 upon which one end of an arm 40 is mounted. The arm 40 extends laterally over the side frame member 1. A double acting hydraulic cylinder 42 is mounted on the outside of the frame member 1, with its piston rod 44 being positioned for movement longitudinally of the frame member 1. The piston rod 44 has a connecting block 46 at its outer end and the arm 40 is rigidly secured to the block 46. Movement of the piston rod 44 therefore displaces the carriage 26 longitudinally of the frame member 1 between the positions shown in FIGS. 2 and 4.

The hydraulic circuit is shown diagrammatically in FIG. 1, and includes hydraulic lines 48 connecting the respective opposite ends of the hydraulic cylinder 42 with a reversing valve 50. The valve 50 is controlled by means of an electric solenoid 52. Fluid is supplied to the valve 50 under pressure through a hydraulic line 54 controlled by a manually adjustable valve 56 from a hydraulic pump 58. The pump 58 is driven by a motor 60, preferably operated by a source of AC current and supplied with fluid from oil tanks 62. An oil cooler may be provided in one of the tanks 62. These parts are shown as mounted on a shelf 64 under the conveyor frame members 1, although it will be understood that they may be located in any suitable or convenient position.

The valve 50 is controlled electrically by the solenoid 52. At the discharge end of the frame members 1, a switch 66 is mounted in a fixed position on a support 68 which extends transversely between the ends of the members 1. The switch 66 has a depending finger 70, the lower end of which is spaced a short distance above the surface of the conveyor 6 when the carriage 26 is displaced to the outward limit of its travel. The switch 66 is preferably a microswitch and the finger 70 is preferably a heavy wire and the switch is sufficiently sensitive to close when an article on the surface of the conveyor engages the lower end of the finger 70. When the switch 66 closes, the solenoid 52 is energized to reverse the position of the spool in the valve 50 and thereby cause fluid under pressure to flow to the rod end of the cylinder 42. The head end of the cylinder 42 is connected through the valve 50 with the tanks 62 and therefore when the piston moves toward the left, as viewed in FIG. 1. Since the carriage 26 is rigidly connected to the piston rod 44, the carriage also travels toward the left.

At the opposite end of its travel, the carriage saddle 38 engages a pivoted switch lever 72, which actuates a switch 74 that is connected electrically with the solenoid 52 when the carriage 26 reaches the end of its travel. Closing the switch 74 causes the solenoid 52 to reverse the position of the valve 50 and to conduct fluid under pressure to the head end of the cylinder 40 to move the carriage 26 outwardly to the position shown in FIG. 2. It is preferred that the carriage 26 move outwardly at a higher rate of speed than the speed of travel of the conveyor 6 and by means of the manual valve 56, the rate of fluid flow to the cylinder 40, which determines the speed of the carriage 26, can be adjusted.

A conventional piston unloading device 76 is mounted on the side frame 1 in the path of the connecting block 46. The device 76 is connected in series hydraulic circuit between the head end of the cylinder 42 and the tanks 62. When the connecting block 46 engages the plunger in the unloading device 76, as shown in FIGS. 1 and 2, the plunger opens a bypass valve permitting high-pressure fluid to flow from the high-pressure hydraulic line 48 to the tanks 62. Preferably, there is a flow restricting orifice in series circuit with the unloading device 76, so that as fluid continues to flow to the head end of the piston, sufficient force will be imposed on the connecting rod 44 to maintain the carriage 26 at its outermost position. When the switch 62 is tripped, however, and the carriage moves away from the unloading device 76, the plunger operated bypass valve in the device 76 closes and remains closed until the carriage returns to the position shown in FIG. 1.

In operation, the motors 20 and 60 are started and the speed of the conveyor 6 is adjusted according to the requirements of the transfer operation. The conveyor 8 also advanced advances continuously in the direction of the arrow in FIG. 2. The valve 56 and the control 22 are adjusted to provide a greater rate of travel outwardly for the carriage 26 than the rate of advance of the conveyor 6. After the adjustments have been completed, articles 78, which are shown schematically in FIG. 2, are deposited in series on the conveyor 6. The conveyor 6 advances in the direction of the arrow in FIG. 2. The carriage is normally positioned at the outer end of the frame members 1, as shown in FIG. 2.

When the first article 78 passes over the forward roller shaft 32 of the carriage, it engages the finger 70 of the switch 66, thereby energizing the solenoid 52 to displace the valve 50 to its opposite position where fluid under pressure is conducted to the rod end of the cylinder 42. Movement of the piston rod 44 toward the left, as viewed in FIG. 1, draws the carriage 26 toward the left. Since the takeup roller 16 maintains tension in the conveyor 6, movement of the carriage 26 has the effect of accelerating the discharge of articles from the surface of the conveyor 6. The articles 78 drop on the surface of the receiving conveyor 8 in a transverse row, as shown schematically in FIG. 2. Of course, the row of articles 78 on the conveyor 8 would no be aligned at right angles to the direction of travel of the conveyor 8 unless the receiving conveyor were moving at a very low speed. Preferably, however, the motion of the carriage 26 and the rate of advance of the conveyor 6 are sufficiently high to deposit the articles on the receiving conveyor, in a row that extends approximately transversely of the receiving conveyor.

When the carriage 26 reaches its fully retracted position, the takeup roller 16 has moved downwardly to a position near the lower end of the slots 18, although it is still freely supported by the conveyor 6 and maintains tension in the conveyor. The arm 40 engages the lever 72 on the switch 74, as shown in FIG. 5, when the carriage 26 is fully retracted. The switch 74 energizes the solenoid 52 to cause the valve 50 to reverse its position and to direct fluid under pressure through the hydraulic line 48 to the head end of the cylinder 42. This causes the piston rod 44 to be displaced toward the right as viewed in FIG. 1 until it engages the plunger of the unloading device 76 and the carriage 26 then remains in the outermost position until another article on the conveyor 6 engages the switch finger 70. Since the carriage 26 advances from its retracted position toward its extended position at a greater rate than the speed of the conveyor 6, any articles that were positioned over the forward shaft 30 of the carriage 26, at the time the carriage began to move toward the right, are displaced rearwardly relative to the carriage 26. This difference in rate also provides for spacing between rows of articles 78 on the receiving conveyor 8. By adjusting the control 22 and the valve 56, the spacing between articles in the same row and spacing between rows on the conveyor 8 can be readily adjusted.

The transfer equipment of this invention provides a convenient means for transferring a series of articles on one conveyor to a series of transverse rows of articles on a receiving conveyor. The apparatus avoids complex timing equipment and is particularly suitable for operations where the articles on the conveyor 6 are irregularly spaced, and yet it is desirable to arrange the articles in transverse rows on the receiving conveyor. This is important, for example, in a freezing plant where the receiving conveyor 8 moves through a freezing hood. In order to provide efficient operation of the hood, it is necessary to advance the conveyor 8 at a slower rate than that at which the articles are formed, and deposited on the transfer conveyor 6. Thus, a large number of articles are arranged efficiently on the wide, slow moving receiving conveyor 8 for freezing without slowing down the high rate of production of the articles that are to be frozen.

While this invention has been illustrated and described in one embodiment, it is recognized that variations and changes may be made therein without departing from the invention as set forth in the claims.

I claim:

1. Apparatus for transferring articles comprising elongated frame means, endless conveyor means, means for supporting said conveyor means on said frame means, said supporting means including a plurality of support rollers spaced apart longitudinally of said frame means to provide an upper article supporting run of said conveyor means, carriage means at one end of said frame means, said carriage means being mounted for reciprocating movement longitudinally of said frame means, said carriage means including at least one of said support rollers, means for maintaining tension in said conveyor means, means for maintaining said carriage normally at an extended position relative to said frame means, means for retracting said carriage from said extended position along said frame means in response to the presence of an article on said conveying means at said carriage while at said extended position, and means for displacing said carriage from said retracted position to said extended position, whereby articles on a said conveying means are discharged in succession from said carriage during retracting movement of said carriage after one of said articles has advanced to said carriage.

2. The apparatus according to claim 1 wherein said tension maintaining means includes a pair of rollers spaced apart on said frame means, said conveying means being suspended in a loop between said roller means, and a roller in said loop, and means for guiding said roller vertically with respect to said frame means, whereby the weight of the roller applies tension to the conveying means as the loop is lengthened and shortened in response to displacement of said carriage means.

3. The apparatus according to claim 2 wherein said frame means includes a pair of upright legs aligned with the space between said pair of rollers, said legs including slots extending longitudinally thereof, trunnions on said roller, said trunnions being received in said slots, whereby said roller moves freely up and down said pair of legs in response to displacement of said carriage.

4. The apparatus according to claim 1 wherein said carriage means includes a carriage frame, roller means on opposite sides of said carriage frame to allow movement of said carriage frame relative to said frame means, and said displacing means including power means connected with said carriage frame for displacing said carriage frame longitudinally of said frame means.

5. The apparatus according to claim 1 including means for normally maintaining said carriage means at a predetermined extended position, switch means on said frame means, said switch means being in position for actuation by an article on said conveyor means while said carriage means is at said extended position, power means for reciprocating said carriage means between said extended and retracted positions, and control means for actuating said power means in response to said switch means, whereby said carriage is displaced from said extended position toward said retracted position upon actuation of said switch means.

6. The apparatus according to claim 5 including second switch means on said frame means, said switch means being in position for actuation by said carriage means upon movement of said carriage means to said retracted position, and said control means causing said power means to displace said carriage means for from said retracted position toward said extended position in response to actuation of said second switch means.

7. The apparatus according to claim 6 wherein said power means includes a hydraulic cylinder having a piston and connecting rod mounted for longitudinal reciprocating movement relative to said frame means, and means securing said connecting rod with said carriage frame, whereby displacement of said connecting rod causes corresponding movement of said carriage means longitudinally of said frame means.

8. The apparatus according to claim 1 wherein said frame means includes a pair of elongated side members and guide means in said side members, said carriage means includes a carriage frame and rollers at opposite sides of said carriage frame, said rollers being received in said side frame guide means for longitudinal movement of said carriage frame relative to said side members between an extended position and a retracted position, said conveyor means support surface being longer when said carriage means is in said extended position than when said carriage means is in said retracted position, and means for advancing said conveyor means along said support surface in a direction toward said carriage for discharge of articles over said one support roller on said carriage means.

9. The apparatus according to claim 1 wherein said retracting means includes first switch means on said frame means, said first switch means being in position to be actuated by an article on said carriage means when said carriage is in said extended position, said displacing means includes second switch means on said frame means, said second switch means being in position to be actuated by said carriage means when said carriage means is in said retracted position, said retracted means also including first power means connected with said carriage means, said first switch means upon actuation causing said power means to displace said carriage means from said extended position toward said retracted position, said displacing means also including second power means connected with said carriage means, said second switch means upon actuation causing said power means to displace said carriage means from said retracted position toward said extended position, whereby said carriage remains at said extended position until an article on said conveyor actuates said first switch means.

10. The apparatus according to claim 9 wherein said first and second power means includes a common hydraulic cylinder secured on said frame means and a reciprocating piston and a connecting rod secured to said frame means and a secured to said carriage frame and includes a source of hydraulic fluid i under pressure, a said first power means includes conduit means connecting said fluid source with said hydraulic cylinder at the connecting rod end, said second power means includes conduit means connecting said fluid source with said hydraulic cylinder at the head end, valve means between said source and said hydraulic cylinder for controlling flow of said fluid alternatively to said head end and rod end, means for operating said valve means in response to an electrical signal, said first switch means being connected with said valve operating means for positioning said valve to conduct fluid to one of said cylinder ends, and said second switch means being connected with valve operating means for positioning a said control valve means to conduct fluid to the other of said cylinder ends, whereby said carriage is displaced in response to actuation of the respective switch means.

11. The apparatus according to claim 9 wherein said conveyor advancing means includes means for adjusting the rate of advance of said conveyor means, and said carriage displacing means includes means for adjusting the rate of flow of hydraulic fluid to said hydraulic cylinder, whereby the rate of advance of the conveyor means can be adjusted to control the rate of movement of said carriage from said retracted position to said extended position.

12. A method of transferring articles advancing in a series on an endless belt transfer conveyor to a receiving conveyor where the articles are arranged in transverse rows, said transfer conveyor having a frame and said belt providing an article supporting surface, comprising: advancing said belt relative to said transfer conveyor frame toward one end of said article supporting surface from which articles are discharged onto said receiving conveyor, displacing said surface one end toward the opposite end in response to an article on said support surface being positioned adjacent said one end, and subsequently displacing said support surface one end away from said opposite end at a rate greater than the rate of advance of said conveyor. whereby articles on said support surface are discharged from said one end in a row extending transversely of the direction of movement of said conveyor while said one end is being displaced toward said opposite end and said articles are temporarily retained on said conveyor means while said one end is being displaced away from said opposite end.

13. The method according to claim 12 including maintaining said conveyor support surface at a predetermined position over said receiving conveyor in the absence of an article on said support surface at said predetermined position.

14. The method according to claim 12 including maintaining said one end of said support surface at said extended position until an article on said support surface advances to said one end, said displacing being initiated by engagement of an article on said conveyor with a switch on said conveyor frame.

UNITED STATES PATENT OFFICE
CERTIFICATE OF CORRECTION

Patent No. 3,550,749            Dated December 29, 1970

Inventor(s) William E. Story

It is certified that error appears in the above-identified patent and that said Letters Patent are hereby corrected as shown below:

Column 1, line 50, after "roller" insert --rides--.
Column 4, line 3, delete "advanced".
Column 4, line 25, change "no" to --not--.
Column 5, line 21, delete "a".
Column 5, line 62, delete "for".

Column 6, line 34, delete "i".
Column 6, line 34, delete "a".
Column 6, line 45, change "valve" to --said--.
Column 6, line 46, delete "a".
Column 6, line 69, change the period "." to a comma --,--.

Signed and sealed this 9th day of May 1972.

(SEAL)
Attest:

EDWARD M. FLETCHER, JR.        ROBERT GOTTSCHALK
Attesting Officer              Commissioner of Patents

UNITED STATES PATENT OFFICE
CERTIFICATE OF CORRECTION

Patent No. 3,550,749　　　　　　　Dated December 29, 1970

Inventor(s) William E. Story

It is certified that error appears in the above-identified patent and that said Letters Patent are hereby corrected as shown below:

Column 6, line 32, cancel "frame means and a"; line 33, cancel "secured to said".

Signed and sealed this 24th day of October 1972.

(SEAL)
Attest:

EDWARD M. FLETCHER, JR.
Attesting Officer

ROBERT GOTTSCHALK
Commissioner of Patents